US012651709B2

(12) United States Patent
Suzuki et al.

(10) Patent No.: US 12,651,709 B2
(45) Date of Patent: Jun. 9, 2026

(54) ELECTROLYTIC CAPACITOR

(71) Applicant: Panasonic Intellectual Property Management Co., Ltd., Osaka (JP)

(72) Inventors: Hiroaki Suzuki, Osaka Fu (JP); Hitoshi Ishimoto, Hyogo Ken (JP); Masahiro Ueda, Saga Ken (JP); Toshiyuki Kato, Saga Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 172 days.

(21) Appl. No.: 18/836,158

(22) PCT Filed: Jan. 20, 2023

(86) PCT No.: PCT/JP2023/001731
§ 371 (c)(1),
(2) Date: Aug. 6, 2024

(87) PCT Pub. No.: WO2023/153177
PCT Pub. Date: Aug. 17, 2023

(65) Prior Publication Data
US 2025/0166930 A1      May 22, 2025

(30) Foreign Application Priority Data
Feb. 14, 2022    (JP) ................................ 2022-020832

(51) Int. Cl.
*H01G 9/035*          (2006.01)
*H01G 9/028*          (2006.01)
(Continued)

(52) U.S. Cl.
CPC ............. *H01G 9/035* (2013.01); *H01G 9/028* (2013.01); *H01G 9/052* (2013.01); *H01G 9/145* (2013.01); *H01G 9/15* (2013.01)

(58) Field of Classification Search
CPC ........ H01G 9/035; H01G 9/028; H01G 9/052; H01G 9/145; H01G 9/15
See application file for complete search history.

(56) References Cited

U.S. PATENT DOCUMENTS 12,278,060 B2 * 4/2025 Sugawara ............ H01G 9/0036
2006/0084237 A1 * 4/2006 Kobayashi ............. H01G 11/56
438/381
(Continued)

FOREIGN PATENT DOCUMENTS

JP        2003-022938 A      1/2003
JP        2008-218920 A      9/2008
(Continued)

OTHER PUBLICATIONS

International Search Report (with English translation) and Written Opinion dated Apr. 18, 2023 from corresponding International Application No. PCT/JP2023/001731, 8 pages.

*Primary Examiner* — Michael P McFadden
(74) *Attorney, Agent, or Firm* — Rimon P.C.

(57)        ABSTRACT

An electrolytic capacitor includes a porous anode body, a dielectric layer formed on a surface of the anode body, and a conductive polymer and a salt compound that are filled inside pores of the anode body. L is a shortest distance from a center of the anode body to a first principal surface of the anode body, the first principal surface being closest to the center, and a region in which a minimum value of respective distances to principal surfaces of the anode body is L/3 or less, and a region in which the minimum value is 2L/3 or more, are defined as a surface layer part and a central part, respectively, inside the anode body. A ratio B/A of an ion strength B derived from the salt compound to a sum A of all ion strengths measured by time-of-flight secondary ion mass spectrometry (TOF-SIMS) in a cross section that passes through the center and that is perpendicular to the first (Continued)

principal surface is defined as an ion strength ratio. A ratio R2/R1 of an ion strength ratio R2 in the central part of the anode body to an ion strength ratio R1 in the surface layer part of the anode body is 0.15 or more.

10 Claims, 3 Drawing Sheets

(51) Int. Cl.
| | | |
|---|---|---|
| *H01G 9/052* | (2006.01) | |
| *H01G 9/145* | (2006.01) | |
| *H01G 9/15* | (2006.01) | |

(56) References Cited

U.S. PATENT DOCUMENTS

2008/0259528 A1* 10/2008 Fujita ....................... H01G 9/15
29/25.03

2009/0086413 A1* 4/2009 Takatani ................... H01G 9/15
29/25.03
2010/0238608 A1* 9/2010 Dreissig ................. H01G 9/145
361/505
2011/0211294 A1 9/2011 Ueda
2015/0187509 A1 7/2015 Kosuge et al.
2017/0330692 A1* 11/2017 Tochio ..................... H01G 9/15

FOREIGN PATENT DOCUMENTS

| JP | 2009-182157 A | 8/2009 |
|---|---|---|
| JP | 2011-181610 A | 9/2011 |
| JP | 2011-225690 A | 11/2011 |
| JP | 2014-143390 A | 8/2014 |
| JP | 2019-145679 A | 8/2019 |
| WO | 2014/050071 A1 | 4/2014 |

* cited by examiner

ELECTROLYTIC CAPACITOR

CROSS-REFERENCE TO RELATED APPLICATIONS

This application is the U.S. National Phase under 35 U.S.C. § 371 of International Application No. PCT/JP2023/001731, filed on Jan. 20, 2023, which claims the benefit of foreign priority to Japan Patent Application No. 2022-020832 filed on Feb. 14, 2022, the entire contents of each of which are hereby incorporated by reference.

TECHNICAL FIELD

The present invention relates to an electrolytic capacitor, and particularly relates to an electrolytic capacitor that includes a solid electrolyte layer including a conductive polymer.

BACKGROUND ART

Electrolytic capacitors have small equivalent series resistances (ESRs) and excellent frequency characteristics, and therefore are mounted in various electronic devices. Usually, an electrolytic capacitor includes a capacitor element including an anode part and a cathode part. The anode part includes a porous anode body, and a dielectric layer is formed on a surface of the anode body. The dielectric layer is in contact with an electrolyte. Some electrolytic capacitors use a solid electrolyte such as a conductive polymer as the electrolyte (e.g., see Patent Literature 1).

Patent Literature 2 describes a manufacturing method of a solid electrolytic capacitor that includes a capacitor element including an anode body having a dielectric film formed on a surface thereof, and a conductive polymer layer formed on the anode body. The manufacturing method includes the steps of: forming a dielectric film on a surface of an anode body: forming a first conductive polymer layer on the dielectric film: impregnating the anode body having the first conductive polymer layer formed thereon with an ionic liquid; and, after impregnation of the ionic liquid, forming a second conductive polymer layer on the first conductive polymer layer. This method is described as providing the effect of repairing damage to the dielectric film, thus enhancing the voltage endurance properties.

CITATION LIST

Patent Literatures

Patent Literature 1: Japanese Laid-Open Patent Publication No. 2009-182157
Patent Literature 2: Japanese Laid-Open Patent Publication No. 2011-181610

SUMMARY OF INVENTION

Technical Problem

However, in an electrolytic capacitor using a porous body as the anode body, it is difficult to impregnate the ionic liquid deeply into the anode body. The technique described in Patent Literature 2 provides no guideline indicating to what extent the ionic liquid distribution inside the anode body should be enhanced when impregnating the ionic liquid deeply into the anode body, and there is still room for investigation.

Solution to Problem

In view of the foregoing, an aspect of the present disclosure relates to an electrolytic capacitor including: a porous anode body: a dielectric layer formed on a surface of the anode body; and a conductive polymer and a salt compound that are filled inside pores of the anode body, wherein the salt compound is a salt of a cation and an anion, when L is a shortest distance from a center of the anode body to a first principal surface of the anode body, the first principal surface being closest to the center, a region in which a minimum value of respective distances to principal surfaces of the anode body is $L/3$ or less is defined as a surface layer part inside the anode body, a region in which a minimum value of the respective distances to the principal surfaces of the anode body is $2L/3$ or more is defined as a central part inside the anode body, R1 ($=B1/A1$) is a ratio of an ion strength B1 derived from the salt compound to a sum A1 of all ion strengths measured by time-of-flight secondary ion mass spectrometry (TOF-SIMS) in a cross section of the surface layer part that passes through the center and perpendicular to the first principal surface, and R2 ($=B2/A2$) is a ratio of an ion strength B2 derived from the salt compound to a sum A2 of all ion strengths measured by the time-of-flight secondary ion mass spectrometry in the cross section of the central part, R2/R1 is 0.15 or more.

Advantageous Effects of Invention

A highly reliable electrolytic capacitor can be achieved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
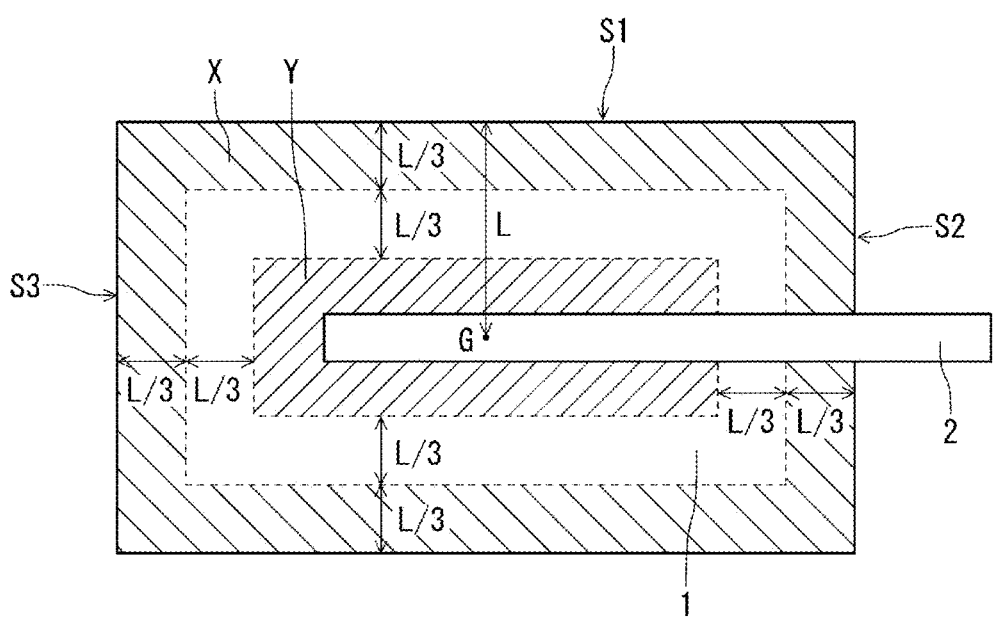
FIG. 1 A cross-sectional view of an anode body for illustrating a surface layer part and a central part of an anode body of an electrolytic capacitor according to an embodiment of the present disclosure.

In the following, embodiments of the present disclosure will be described by way of examples. However, the present disclosure is not limited to the examples described below. Although examples of specific numerical values, materials, and the like may be given in the following description, other numerical values, materials, and the like may be used as long as the effects of the present disclosure can be achieved. In the present specification, the expression "from a numerical value A to a numerical value B" includes the numerical value A and the numerical value B, and can be read as "a numerical value A or more and a numerical value B or less". In the following description, when examples of the lower and upper limits of a numerical value related to a specific physical property, condition, or the like are given, any one of the given examples of the lower limit and any one of the given examples of the upper limit can be freely combined as long as the lower limit is not equal to or not greater than the upper limit. When a plurality of materials are given as examples, one of the materials may be selected and used alone, or two or more of the materials may be used in combination.

The present disclosure encompasses combinations of matters recited in two or more claims freely selected from a plurality of claims recited in the appended claims. That is, matters recited in two or more claims freely selected from a plurality of claims recited in the appended claims can be combined as long as there are no technical discrepancies.

An electrolytic capacitor according to an embodiment of the present disclosure includes a porous anode body, and a dielectric layer formed on a surface of the anode body. Usually, at least a portion of the dielectric layer is covered by a solid electrolyte layer, and at least a portion of the solid electrolyte layer is covered by a cathode layer. Here, since the anode body is a porous body, the dielectric layer is formed along inner side walls of the pores of the anode body, which is a porous body, and the solid electrolyte layer is formed so as to close the pores of the anode body. The pores inside the anode are filled with a conductive polymer and a salt compound. The salt compound is a salt of a cation and an anion. The cation may be an organic cation.

When a high voltage is continuously applied to the electrolytic capacitor for a long period of time at high temperature, the dielectric layer is likely to be damaged. Due to the damage caused to the dielectric layer, the insulation in the damaged portion is reduced, and a large leakage current is likely to flow through the damage portion concentratedly. The flow of a large current causes degradation of the conductive polymer present on the path of the leakage current in the vicinity of the damage portion of the dielectric layer, so that the resistance is likely to be increased. As a result, the capacitance of the electrolytic capacitor is prone to be reduced in an environment in which a high voltage is applied under high temperature.

The inclusion of the salt compound in the solid electrolyte layer can provide the salt compound with the effect of repairing damage caused to the dielectric layer, thus inhibiting degradation of the conductive polymer and suppressing a reduction in capacitance of the electrolytic capacitor. The salt compound has fluidity in the expected usage environment. The salt compound may be an ionic liquid that is liquid in the expected usage environment. The salt compound, which is an ionic liquid, flows through gaps inside the conductive polymer, and a portion of the salt compound reaches the vicinity of the surface of the dielectric layer. If any damage is caused to the dielectric layer, the salt compound has the function of repairing the damage.

The salt compound can be dispersed inside the solid electrolyte layer formed of the conductive polymer by immersing, in the liquid salt compound, the anode body having formed thereon the conductive polymer layer covering the dielectric layer, and impregnating the salt compound into the conductive polymer layer. In this case, the salt compound is less likely to be impregnated in a portion closer to the central part of the anode body, so that a distribution occurs in the salt compound concentration between the surface layer part and the central part of the anode body. From the viewpoint of inhibiting degradation of the conductive polymer and suppressing a reduction in capacitance of the electrolytic capacitor, it is important that a sufficient amount of the salt compound is distributed also in the central part of the anode body that is located deep inside the pores of the porous body.

However, the deeper the salt compound is to be impregnated inside the pores of the anode body, the higher the costs, such as time cost, required for manufacture will be. On the other hand, there is no clear guideline indicating to what extent the salt compound is to be present in the central part of the anode body, and impregnating the anode body with the salt compound in an amount more than necessary may possibly result in deterioration in the properties of the electrolytic capacitor, such as an increase in the manufacturing cost and an increase in the ESR. In terms of this problem, the present disclosure is to provide a guideline for the amount of the salt compound to be contained in the central part of the anode body.

The distribution state of the salt compound in the anode body can be evaluated by time-of-flight secondary ion mass spectrometry (TOF-SIMS).

The time-of-flight secondary ion mass spectrometry (TOF-SIMS) is a method of highly accurately detecting the structure of a solid surface by irradiating the solid surface with a beam of primary ions, and detecting the secondary ions generated from collision between the primary ions and the solid surface at molecular or atomic scale, using a mass spectrometer. The secondary ions are accelerated by an electric field and reach the detector. The time (time of flight) to reach the detector depends on the mass and the valence of the secondary ions. Accordingly, the information about the elements, compounds, and the like that are present on the solid surface can be accurately obtained by measuring the distribution of the times of flight of the secondary ions.

In a given region of a cross section of the anode body, A is defined as the sum of all ion strengths measured by the time-of-flight secondary ion mass spectrometry (TOF-SIMS). B is defined as the ion strength derived from the salt compound, among the sum A of the ion strengths. The sum A of the ion strengths can be determined by integrating the peaks of all ions with the times of flight in a mass spectrometry spectrum. The ion strength B derived from the salt compound can be determined by integrating the peaks of ions derived from the salt compound with the times of flight in a mass spectrometry spectrum. It can be said that a ratio B/A of the ion strength B derived from the salt compound to the sum A of the ion strengths represents the content ratio of the salt compound in that region.

The ion strengths may anion strengths or may be cation strengths. That is, the ion strengths derived from the anions contained in the salt compound may be measured, or the ion strengths derived from the corresponding cations may be determined. Although an example in which the ion strengths are anion strengths will be described in the following embodiment, the present invention is not limited thereto.

L is defined as the distance (shortest distance) from the center of the anode body to a predetermined first principal surface of the anode body. The center of the anode body refers to the center of gravity. Note, however, that the center of gravity of the anode body here is determined taking only the shape of the outer shell of the anode body, assuming that the density inside the anode body is constant, without taking the density distribution inside the anode body into account.

The anode body has one or more principal surfaces. Inside the anode body, a region in which a minimum value of the respective distances to the one or more principal surfaces is L/3 or less (i.e., a region in which the distance to at least one principal surface is L/3 or less) is defined as a surface layer part, and a region in which a minimum value of the respective distances to the one or more principal surfaces is 2L/3 or more (i.e., a region in which the distances to all of the principal surfaces are 2L/3 or more) is defined as a central part.

Let us consider a cross section of the anode body that passes through the center of the anode body and that is perpendicular to the first principal surface. In the cross section, R1 is an anion strength ratio B/A measured in the surface layer part, and R2 is an anion strength ratio B/A measured in the central part. The central part of the anode body is less likely to be impregnated with the salt compound than the surface layer part is, and therefore usually R2<R1, which means that the closer R2/R1 is to 1, the more uniformly the salt compound is distributed from the surface layer part to the central part.

According to the findings of the present disclosure, if R2/R1 is 0.15 or more, the salt compound sufficiently permeates to the center of the anode body, and the effect of repairing damage caused to the dielectric layer can be sufficiently achieved also in the center portion of the anode body. As a result, it is possible to inhibit degradation of the conductive polymer constituting the solid electrolyte layer, and suppress a reduction in capacitance of the electrolytic capacitor. More preferably, R2/R1 is 0.4 or more, in which case a significant effect of inhibiting degradation of the conductive polymer constituting the solid electrolyte layer, and suppressing a reduction in capacitance of the electrolytic capacitor can be achieved. From the viewpoint of reducing the amount of time required to impregnate the anode body with the salt compound and suppressing an increase in the manufacturing cost, R2/R1 may be 0.9 or less, and is more preferably 0.8 or less.

Usually, the anode body has a plurality of principal faces (surfaces). For example, when the anode body has a substantially rectangular parallelepiped shape, the anode body has six principal faces (surfaces) respectively corresponding to the surfaces of the rectangular parallelepiped. R2/R1 may satisfy the above-described relationship when the surface layer part and the central part are defined as described above, taking at least one of the plurality of principal faces as the first principal surface. If R2/R1 satisfies the above-described relationship when one of the plurality of principal faces that is closest in distance from the center of the anode body is taken as the first principal surface, a sufficient effect can be achieved. R2/R1 may satisfy the above-described relationship when one of the plurality of principal faces that is farthest from the center of the anode body is taken as the first principal surface. R2/R1 may satisfy the above-described relationship when each of all of the plurality of principal faces is taken as the first principal surface.

The larger the size of the anode body, the more likely a difference in distribution of the salt compound is to occur between the surface layer part and the central part, so that the effect of repairing damage caused to the dielectric layer may not be sufficiently achieved in the central part. In particular, when the above-described distance L is 0.1 mm or more, the difference in distribution of the salt compound between the surface layer part and the central part is likely to be widened, the degradation of the conductive polymer and the capacitance reduction of the electrolytic capacitor caused by the damage to the dielectric layer become significant. However, with the electrolytic capacitor according to an embodiment of the present disclosure, setting R2/R1 to 0.15 can provide a sufficient effect of repairing damage caused to the dielectric layer also in the central part of the anode body, even if the distance L becomes 0.1 mm or more. Accordingly, it is possible to inhibit degradation of the conductive polymer due to damage caused to the dielectric layer, and suppress a reduction in capacitance of the electrolytic capacitor.

In order to electrically connect the anode body to an external anode terminal, the electrolytic capacitor may be provided with an anode wire (lead-out conductor) planted from the anode body. Inside the anode body, the anode wire usually extends in a direction perpendicular to a second principal surface serving as a planting surface, toward the center of the anode body. Alternatively, the anode wire extends in the direction perpendicular to the second principal surface serving as the planting surface, toward the center of the anode body, then passes through the center, and further extends in a direction away from the planting surface. In this case, the first principal surface for which the surface layer part and the central part are defined may be the planting surface of the anode wire, or may be a surface different from the planting surface. The first principal surface may be a surface different from the planting surface of the anode wire and along a direction in which the anode wire extend inside the anode body. The anode wire may extend in a direction inclined at 0° to 30° relative to the first principal surface inside the anode body.

FIG. 1 shows an example of a cross section of the anode body of the electrolytic capacitor according to the present embodiment for illustrating the surface layer part and the central part. Note that a surface of an anode body 1 is covered by a dielectric layer, and at least a portion of a surface of the dielectric layer is covered by a solid electrolyte layer. Since the anode body 1 is porous, the dielectric layer is formed so as to cover inner side walls of pores of the porous anode body 1, and the solid electrolyte layer may be formed deeply across the interior of the porous anode body 1 (e.g., to a region in the vicinity of the anode wire 2) so as to close the pores of the anode body 1. However, in FIG. 1, the indications of the dielectric layer and the solid electrolyte layer that are formed inside the anode body have been omitted.

An anode wire 2 is planted from the anode body 1. A portion of the anode wire 2 is planted from a principal surface S2 of the anode body and exposed to the outside, and the remainder of the anode wire 2 is embedded in the anode body 1. Inside the anode body 1, the anode wire 2 extends toward a center G of the anode body 1. The anode wire 2 extends to the center G in a direction substantially parallel to a principal surface S1 of the anode body 1, then passes through the center G, and similarly extends in a direction substantially parallel to the surface S1 so as to move away from the surface S2, toward a surface S3 that is opposed to the surface S2.

L is the distance (shortest distance) from the center G of the anode body 1 to the principal surface S1. A surface layer part X is a region in which the minimum value of the respective distances to the principal surfaces of the anode body is L/3 or less. A central part Y is a region in which the minimum value of the respective distances to the principal surfaces of the anode body is 2L/3 or more. Note that although the anode wire 2 is included in the region in which the distances to the principal surfaces S1 to S3 are 2L/3 or more in FIG. 1, the region in which the anode wire 2 is present is not included in the central part Y.

R2/R1 can be determined, for example, in the following manner.

First, an anode body having a solid electrolyte layer formed thereon is cut so as to form a cross section that is perpendicular to a principal surface S1 and that includes a center G of the anode body. The cross section may be formed using a cross section polisher (CP). In the cross section, L is the distance (shortest distance) from the center G of the anode body to the principal surface S1. In the cross section, a region in which the distance to the outer contour of the anode body is L/3 or less is a surface layer part X, and a region in which the distance to the outer contour of the anode body is 2L/3 or more is a central part Y. Note that when an anode wire appears in the cross section, the region in which the anode wire appears is not included in the central part. The cross section may be a surface along a direction in which the anode wire extends, or may be a surface perpendicular to the direction in which the anode wire extends.

Next, anion strengths are measured by time-of-flight secondary ion mass spectrometry (TOF-SIMS), while scanning measurement locations along the cross section. The measurement locations are scanned inside the surface layer part X, and a ratio R1=B1/A1 of the strengths (the number counted) B1 of the secondary anions derived from the salt compound to a sum A1 of the strengths (the number counted) of all of the detected secondary anions, is calculated. Similarly, the measurement locations are scanned inside the central part Y, and a ratio R2=B2/A2 of the strengths (the number counted) B2 of the secondary anions derived from the salt compound to a sum A2 of the strengths (the number counted) of all of the detected secondary anions is calculated. Thus, R2/R1 is determined.

The following shows an example of detailed measurement conditions for the time-of-flight secondary ion mass spectrometry (TOF-SIMS).

Primary ion: Au
Acceleration voltage: 30 kV
Measurement mode: bunching mode (high-mass resolution measurement)
Measurement range: 100 μm×100 μm
Measurement apparatus: PHI TRIFT V nanoTOF (manufactured by ULVAC-PHI, Inc.)

Examples of the cation constituting the salt compound include imidazolium, pyrrolidinium, piperidinium, pyridinium, morpholinium, ammonium, phosphonium, sulfonium, and derivatives thereof. The cation may be an organic cation. Examples of the anion include anions of acids such as a hydrogen sulfate ion, acetic acid, sulfuric acid, lactic acid, nitric acid, benzoic acid, methyl sulfuric acid, methane sulfonic acid, diethyl phosphonic acid, trifluoromethane acetic acid, and trifluoromethane sulfonic acid, and derivatives thereof. The anion may contain fluorine. Examples of the fluorine-containing anion include anions of the aforementioned trifluoromethane acetic acid and trifluoromethane sulfonic acid, as well as bis(trifluoromethylsulfonyl)imide anions and derivatives thereof.

The salt compound may be an ionic liquid. An ionic liquid is synonymous with a salt in a molten state (molten salt), and is, for example, an ionic substance that exhibits a liquid state at 25° C. Examples of the ionic liquid include 1-butyl-3-methylimidazolium hydrogen sulfate, 1-butyl-3-methylimidazolium bis(trifluoromethanesulfonyl)imide, 1-butyl-3-methylimidazolium trifluoromethane sulfonate, and 1-ethyl-3-methylimidazolium diethyl phosphonate.

The ionic liquid is preferably a hydrophilic ionic liquid. A hydrophilic ionic liquid is prone to retain moisture, and the performance of repairing damage caused to the dielectric layer is likely to be improved by the moisture contained in the ion liquid. Here, an ionic liquid in which the amount of moisture measured by the Karl Fischer technique is 0.2 mass % or more relative to the total mass of the ionic liquid is defined as a hydrophilic ionic liquid, and an ionic liquid in which the above-described amount is less than 0.2 mass % is defined as a hydrophobic ionic liquid. Of the above-described ionic liquids, 1-butyl-3-methylimidazolium hydrogen sulfate, 1-butyl-3-methylimidazolium trifluoromethane sulfonate, and 1-ethyl-3-methylimidazolium diethyl phosphonate are hydrophilic ionic liquids.

<<Electrolytic Capacitor>>

Figure 2:
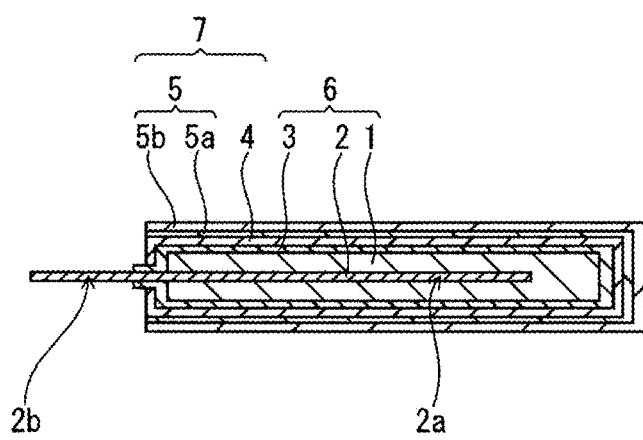
FIG. 2 A cross-sectional view schematically showing an example of a capacitor element of an electrolytic capacitor according to the embodiment of the present disclosure.
Figure 3:
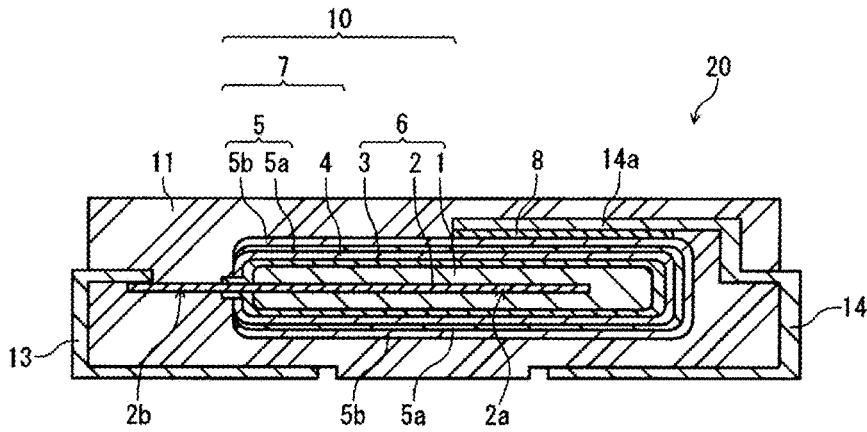
FIG. 3 A cross-sectional view schematically showing the electrolytic capacitor according to the embodiment of the present disclosure.

In the following, an electrolytic capacitor and a manufacturing method thereof according to the present embodiment will be described, with reference to the drawings as appropriate. However, the present invention is not limited thereto. FIG. 2 is a cross-sectional view schematically showing an example of a capacitor element of the electrolytic capacitor according to the present embodiment. FIG. 3 is a schematic cross-sectional view of the electrolytic capacitor according to the present embodiment.

An electrolytic capacitor 20 includes a capacitor element 10 including an anode part 6 and a cathode part 7, an exterior member 11 that seals the capacitor element 10, an anode lead terminal 13 that is electrically connected to the anode part 6 and is partly exposed from the exterior member 11, and a cathode lead terminal 14 that is electrically connected to the cathode part 7 and is partly exposed from the exterior member 11. The anode part 6 includes an anode body 1 and an anode wire 2. A dielectric layer 3 is formed on a surface of the anode body. The cathode part 7 includes a solid electrolyte layer 4 that covers at least a portion of the dielectric layer 3, and a cathode layer 5 that covers at least a portion of a surface of the solid electrolyte layer 4.

<Capacitor Element>

In the following, the capacitor element 10 will be described in detail, taking, as an example, a case where a solid electrolyte layer is included as an electrolyte.

An anode part 6 includes an anode body 1, and an anode wire 2 extending from one surface of the anode body 1 and electrically connected to an anode lead terminal 13.

For example, the anode body 1 is a rectangular parallelepiped-shaped porous sintered body obtained by sintering metal particles. As the aforementioned metal particles, particles of valve metals such as titanium (Ti), tantalum (Ta), and niobium (Nb) are used. For the anode body 1, one, or two or more kinds of metal particles are used. The metal particles may be an alloy made of two or more metals. For example, an alloy containing silicon, vanadium, boron, and the like, together with a valve metal, can be used. A compound containing a valve metal and a typical element such as nitrogen may be used. The valve metal alloy is mainly composed of a valve metal, and contains, for example, 50 atom % or more of the valve metal.

The anode wire 2 is formed of a conductive material. The material of the anode wire 2 is not particularly limited, and examples thereof include copper, aluminum, and an aluminum alloy, in addition to the above-described valve metals. The materials that form the anode body 1 and the anode wire 2 may be of the same kind or different kinds. The anode wire 2 has a first portion 2a embedded into the anode body 1 from one surface of the anode body 1, and a second portion 2b extending from the one surface of the anode body 1. The cross-sectional shape of the anode wire 2 is not particularly limited, and examples thereof include a circular shape, a track shape (a shape formed by straight lines parallel to each other, and two curved lines connecting ends of the straight lines), an oval shape, a rectangular shape, and a polygonal shape.

The anode part 6 is produced, for example, by pressure molding powder of the first metal particles into a rectangular parallelepiped shape, with the first portion 2a embedded in the powder, and sintering the resulting object. Consequently, the second portion 2b of the anode wire 2 is pulled out from the one surface of the anode body 1 so as to be planted. The second portion 2*b* is joined to the anode lead terminal 13 by welding or the like, whereby the anode wire 1 and the anode lead terminal 13 are electrically connected to each other. The welding method is not particularly limited, and examples thereof include resistance welding and laser welding.

A dielectric layer 3 is formed on a surface of the anode body 1. The dielectric layer 3 is formed of a metal oxide, for example. Examples of the method for forming a layer containing a metal oxide on a surface of the anode body 1 include a method involving immersing the anode body 1 in a chemical formation solution to anodize the surface of the anode body 1, and a method involving heating the anode body 1 under an atmosphere containing oxygen. The dielectric layer 3 is not limited to the above-described layer containing a metal oxide as long as it is insulating.

The anode body 1 is not limited to a porous sintered body, and may be, for example, a metal foil of a valve metal, such as an aluminum foil.

(Cathode Part)

The cathode part 7 includes a solid electrolyte layer 4, and a cathode layer 5 that covers the solid electrolyte layer 4. The solid electrolyte layer 4 is formed so as to cover at least a portion of the dielectric layer 3.

For the solid electrolyte layer 4, a manganese compound or a conductive polymer can be used, for example. Examples of the conductive polymer include polypyrrole, polythiophene, polyfuran, polyaniline, and polyacetylene. These may be used alone or in a combination of two or more. The conductive polymer may be a copolymer of two or more kinds of monomers. Because of the excellent conductivity, polythiophene, polyaniline, or polypyrrole may be used. In particular, polypyrrole may be used because of the excellent water repellency.

The solid electrolyte layer 4 containing the above-described conductive polymer may be composed of two or more solid electrolyte layers. For example, the solid electrolyte layer 4 includes a first conductive polymer layer that covers the dielectric layer 3, and a second conductive polymer layer that covers the first conductive polymer layer. When the solid electrolyte layer 4 is composed of two or more layers, the compositions and the formation methods (polymerization methods) of the conductive polymers used for the layers may be different. For example, the first conductive polymer layer may be formed by polymerizing a raw material monomer on the dielectric layer 3. Alternatively, the second conductive polymer layer may be formed by applying a liquid containing the above-described conductive polymer to the dielectric layer 3.

Note that that in the present specification, polypyrrole, polythiophene, polyfuran, polyaniline, and the like refer to polymers including polypyrrole, polythiophene, polyfuran, polyaniline, and the like, respectively, as basic skeletons thereof. Accordingly, polypyrrole, polythiophene, polyfuran, polyaniline and the like may include derivatives thereof. For example, polythiophene includes poly(3,4-ethylenedioxythiophene) and the like.

In order to improve the conductivity of the conductive polymer, various dopants may be added to a polymerization liquid for forming the conductive polymer, or a solution or a dispersion of the conductive polymer. Examples of the dopant include, but are not particularly limited to, naphthalene sulfonic acid, p-toluene sulfonic acid, and polystyrene sulfonic acid.

When the conductive polymer is dispersed in the state of particles in a dispersion medium, an average particle diameter D50 of the particles is, for example, 0.01 μm or more and 0.5 μm or less. When the average particle diameter D50 of the particles is in this range, the particles are likely to penetrate into the anode body 1.

The solid electrolyte layer includes a salt compound. Although not shown in FIGS. 2 and 3, since the anode body 1 is porous, the dielectric layer 3 is formed so as to cover the inner side walls of the pores of the porous anode body 1, and the solid electrolyte layer 4 permeates deeply into the porous anode body 1 (e.g., to a region in the vicinity of the anode wire 2) so as to close the pores of the anode body 1. Inside the solid electrolyte layer, the content of the salt compound may be different between the surface layer side of the anode body 1 and the central part side that is close to the anode wire 2. In the electrolytic capacitor of the present embodiment, the difference between the content of the salt compound on the surface layer side of the anode body 1 and the content of the salt compound on the central part side that is close to the anode wire 2 is reduced. Specifically, inside the solid electrolyte layer, the salt compound is distributed such that the above-described ratio R2/R1 of the anion strength ratio R2 derived from the salt compound in the central part to the anion strength ratio R1 derived from the salt compound in the surface layer part is 0.15 or more.

The cathode layer 5 includes, for example, a carbon layer 5*a* formed so as to cover the solid electrolyte layer 4, and a metal paste layer 5*b* formed on a surface of the carbon layer 5*a*. The carbon layer 5*a* includes a conductive carbon material, such as graphite, and a resin. The metal paste layer 5*b* includes, for example, metal particles (e.g., silver) and a resin. Note that the configuration of the cathode layer 5 is not limited to this configuration. The configuration of the cathode layer 5 may be any configuration having a current collecting function.

<Anode Lead Terminal>

The anode lead terminal 13 is electrically connected to the anode body 1 via the second portion 2*b* of the anode wire 2. The material of the anode lead terminal 13 is not particularly limited as long as the material is electrochemically and chemically stable, and is conductive. The anode lead terminal 13 may be a metal such as copper, or may be a nonmetal. The shape of the anode lead terminal 13 is not particularly limited as long as it is a plate shape. In terms of height reduction, the thickness of the anode lead terminal 13 (the distance between the principal surfaces of the anode lead terminal 13) may be 25 μm or more and 200 μm or less, or may be 25 μm or more and 100 μm or less.

One end of the anode lead terminal 13 may be joined to the anode wire 2 using a conductive adhesive material or solder, or may be joined to the anode wire 2 by resistance welding or laser welding. The other end of the anode lead terminal 13 is led out to the outside of the exterior member 11, and is exposed from the exterior member 11. The conductive adhesive material is, for example, a mixture of a thermosetting resin and carbon particles or metal particles, which will be described later.

<Cathode Lead Terminal>

The cathode lead terminal 14 is electrically connected to the cathode part 7 at a joining part 14*a*. The joining part 14*a* is a portion overlapping the cathode layer 5 of the cathode lead terminal 14 when the cathode layer 5 and the cathode lead terminal 14 joined to the cathode layer 5 are viewed from a direction of the normal of the cathode layer 5.

The cathode lead terminal 14 is joined to the cathode layer 5 via a conductive adhesive material 8, for example. One end of the cathode lead terminal 14 constitutes, for example, a portion of the joining part 14*a*, and is disposed inside the exterior member 11. The other end of the cathode lead terminal 14 is led out to the outside. Accordingly, a portion of the cathode lead terminal 14 that includes the other end thereof is exposed from the exterior member 11.

The material of the cathode lead terminal 14 is also not particularly limited as long as the material is electrochemically and chemically stable, and is conductive. The cathode lead terminal 14 may be a metal such as copper, or may be a nonmetal. The shape of the cathode lead terminal 14 is also not particularly limited, and is long and plate-shaped, for example. In terms of height reduction, the thickness of the cathode lead terminal 14 may be 25 μm or more and 200 μm or less, or may be 25 μm or more and 100 μm or less.

<Exterior Member>

The exterior member 11 is provided in order to provide electrical insulation between the anode lead terminal 13 and the cathode lead terminal 14, and is formed of an insulating material (exterior member material). The exterior member material contains a thermosetting resin, for example. Examples of the thermosetting resin include an epoxy resin, a phenol resin, a silicone resin, a melamine resin, a urea resin, an alkyd resin, a polyurethane, a polyimide, and an unsaturated polyester.

<<Manufacturing Method of Electrolytic Capacitor>>

In the following, an example of a manufacturing method of the electrolytic capacitor according to the present embodiment will be described.

(1) Step of Preparing Capacitor Element

First, a capacitor element is prepared. The step of preparing the capacitor element includes, for example, the steps of: preparing an anode body: covering at least a portion of the anode body by a dielectric layer: covering at least a portion of the dielectric layer by a solid electrolyte layer; and covering at least a portion of the solid electrolyte layer by a carbon layer. The step of preparing a capacitor element may further include a step of covering at least a portion of the carbon layer by a conductive resin layer (conductive paste layer).

(1a) Step of Preparing Anode body

A porous sintered body can be used as an anode body 1. Valve metal particles and an anode wire 2 are placed in a mold such that a first portion 2a is embedded in the valve metal particles, and the whole is pressure-molded, followed by sintering, to obtain an anode part 6 including the anode body 1, which is the porous body of a valve metal. The first portion 2a of the anode wire is embedded into the porous sintered body from one surface thereof. The pressure applied during pressure molding is not particularly limited. Preferably, sintering is performed under reduced pressure. The valve metal particles may be mixed with a binder such as polyacrylic carbonate, as needed.

Usually, valve metal particles are pressure-molded using a rectangular parallelepiped-shaped mold having an internal space, and then sintered. In this case, the sintered anode body 1 also has a rectangular parallelepiped shape, and has a plurality of principal surfaces.

(1b) Step of Forming Dielectric Layer

Next, the anode body 1 is subjected to chemical conversion treatment, to cover at least a portion of the anode body 1 by a dielectric layer 3. Specifically, the anode body 1 is immersed in a chemical conversion tank filled with an aqueous electrolytic solution (e.g., aqueous phosphoric acid solution), a second portion 2b of the anode wire 2 is connected to an anode body of the chemical conversion tank, and anodization is performed, whereby a dielectric layer 3 made of an oxide film of the valve metal can be formed on the surface of the porous portion. The aqueous electrolytic solution is not limited to an aqueous phosphoric acid solution, and it is possible to use nitric acid, acetic acid, sulfuric acid, or the like, for example.

(1c) Step of Forming Solid Electrolyte Layer

Subsequently, at least a portion of the dielectric layer 3 is covered by a solid electrolyte layer 4. Thus, a capacitor element 10 including the anode body 1, the dielectric layer 3, and the solid electrolyte layer 4 is obtained. A solid electrolyte layer 4 including a plurality of conductive polymer layers may be formed.

As an example of forming a solid electrolyte layer 4 including a plurality of conductive polymer layers, the step of preparing a solid electrolyte layer may include the steps of: (i) forming a first conductive polymer layer that covers the dielectric layer by impregnating the anode body with a first solution containing a first monomer serving as a raw material of a first conductive polymer, and polymerizing the first monomer on a surface of the dielectric layer; and (ii) forming a second conductive polymer layer that covers the first conductive polymer layer by impregnating the anode body with a solution or a dispersion containing a second conductive polymer.

In the step (i), using a method involving impregnating the anode body with a monomer or an oligomer, and thereafter polymerizing the monomer or the oligomer by chemical polymerization or electrolytic polymerization, the first conductive polymer layer is formed on the anode body 1 having the dielectric layer 3 formed thereon. The first conductive polymer may contain a dopant. The conductive polymer and the dopant may be respectively selected from the conductive polymers and the dopants shown as examples for the solid electrolyte layer 4.

In the step (i) of forming a first conductive polymer layer, a raw material monomer of a first conductive polymer is oxidatively polymerized (so-called in situ polymerization) above the dielectric layer 3, to form a first conductive polymer layer on the dielectric layer 3. Accordingly, fine projections and recesses due to nonuniform polymerization reaction or nonuniform layer growth may be formed on a surface of the first conductive polymer layer.

In the step (ii), the anode body is impregnated with a solution or a dispersion containing a second conductive polymer, to cover a surface of the first conductive polymer layer with a second conductive polymer layer. By forming the second conductive polymer layer so as to enter the recesses on the surface of the first conductive polymer layer, it is possible to increase the adhesion between the first conductive polymer layer and the second conductive polymer layer.

Prior to the step (ii), the anode body having the first conductive polymer layer formed thereon may be washed, to remove any unnecessary components contained in the first conductive polymer layer, such as the unreacted monomer, the dopant, and the oxidizing agent.

Subsequent to the step (ii), the anode body may be impregnated with a solution or a dispersion containing a third conductive polymer, to form a third conductive polymer layer that covers the second conductive polymer layer.

The second conductive polymer may contain a dopant. The conductive polymer and the dopant may be respectively selected from the conductive polymers and the dopants exemplified for the solid electrolyte layer 4. As the binder, a known binder can be used. The dispersion may contain a known additive that can be used when forming the solid electrolyte layer.

After forming the conductive polymer layer, a step of impregnating the solid electrolyte layer 4 with a salt compound is performed. When the salt compound is an ionic liquid, the impregnation of the salt compound may be performed by immersing the anode body 1 having the conductive polymer layer formed thereon in an ionic liquid, which is the salt compound. The anode body 1 having the conductive polymer layer formed thereon may be immersed in a liquid obtained by mixing the ionic liquid with another solvent. The solid electrolyte layer may be impregnated with the salt compound under a reduced-pressure atmosphere.

In the case of forming a solid electrolyte layer 4 including a plurality of conductive polymer layers, the salt compound impregnation step may be performed after the formation of any one of the conductive polymer layers. The closer the conductive polymer layer impregnated with the salt compound is to the dielectric layer, and the earlier the conductive polymer layer is formed, the easier the salt compound is to be distributed in the vicinity of the dielectric layer, and the easier the damage repairing effect of the dielectric layer is to be improved. On the other hand, the later the conductive polymer layer impregnated with the salt compound is formed, the larger the amount of the salt compound that can be contained inside the solid electrolyte layer. In addition, the ratio R2/R1 of the ion strength derived from the salt compound described above can be more easily controlled to be 0.15 or more.

Since the salt compound is introduced into the solid electrolyte layer by immersing the anode body 1 having the conductive polymer layer formed thereon in the ionic liquid, a difference in the content of the salt compound occurs between the surface layer part of the anode body that is close to the surface of the solid electrolyte layer 4, and the central part of the anode body that is close to the anode wire. Usually, the content of the salt compound in the surface layer part of the anode body is higher than the content of the salt compound in the central part of the anode body. In the electrolytic capacitor according to an embodiment of the present disclosure, the difference in the content of the salt compound between the surface layer part and the central part of the anode body is reduced such that the ratio R2/R1 of the ion strength ratio R2 derived from the salt compound in the central part to the ion strength ratio R1 derived from the salt compound in the surface layer part is 0.15 or more inside the solid electrolyte layer. Thus, it is possible to inhibit degradation of the conductive polymer due to damage caused to the dielectric layer, and reduce a reduction in capacitance of the electrolytic capacitor, without unnecessarily increasing the manufacturing cost.

Note that the above-described ratio R2/R1 can be controlled to be 0.15 or more, for example, by adjusting the conditions for immersing the anode body in the ionic liquid or a liquid mixture of the ionic liquid and another solvent, such as the immersing time, the temperature, the pressure of the atmosphere, the mixing ratio of the ionic liquid.

(1d) Step of Forming Carbon Layer and Conductive Resin Layer

Subsequently, a carbon paste and a metal paste are sequentially applied to the surface of the solid electrolyte layer 4, to form a cathode layer 5 composed of a carbon layer 5a and a conductive resin layer (metal paste layer) 5b. The configuration of the cathode layer 5 is not limited thereto as long as the configuration has a current collecting function.

(2) Step of Electrically Connecting Capacitor Element and Lead Terminals

Next, an anode lead terminal 13 and a cathode lead terminal 14 are prepared. The second portion 2b of the anode wire 2 that is planted from the anode body 1 is joined to the anode lead terminal 13 by laser welding, resistance welding, or the like. After applying a conductive adhesive material 8 to the cathode layer 5, the cathode lead terminal 14 is joined to the cathode part 7 via the conductive adhesive material 8.

Subsequently, the capacitor element 10 and materials (e.g., an uncured thermosetting resin and a filler) of an exterior member 11 are housed in a mold, and the capacitor element 10 is sealed by transfer molding, compression molding, or the like. At this time, a portion of the anode lead terminal 13 and a portion of the cathode lead terminal 14 are exposed from the mold. The molding conditions are not particularly limited, and the time and temperature conditions may be set as appropriate taking into account the curing temperature or the like of the thermosetting resin used.

Finally, the exposed portions of the anode lead terminal 13 and the cathode lead terminal 14 are bent along the exterior member 11, to form bent portions. Consequently, a portion of the anode lead terminal 13 and a portion of the cathode lead terminal 14 are disposed on a mounting surface of the exterior member 11.

Through the above-described method, an electrolytic capacitor 20 is manufactured.

EXAMPLES

Hereinafter, the present invention will be specifically described by way of examples and comparative examples. However, the present invention is not limited to the following examples.

Example 1

An electrolytic capacitor was produced in the following matter.

(Formation of Anode Body)

Tantalum metal particles were used as the valve metal. The tantalum metal particles were molded into a rectangular parallelepiped shape such that one end of an anode wire made of tantalum metal was embedded in the tantalum metal particles, and thereafter the resulting molded article was sintered in a vacuum. This yields an anode part including an anode body made of a porous sintered body of tantalum, and an anode wire whose one end was embedded in the anode body and whose remaining portion was planted from one surface of the anode body. The sintered anode body was a substantially rectangular parallelepiped having a size of about 5.0 mm×4.0 mm×1.0 mm, and the anode wire was planted from a surface of 4.0 mm×1.0 mm.

Subsequently, the anode body and a portion of the anode wire that was planted from the anode body was immersed in a chemical conversion tank filled with an aqueous phosphoric acid solution serving as an aqueous electrolytic solution, and the other end of the anode wire was connected to an anode body of the chemical conversion tank. Then, anodization was performed to form a uniform dielectric layer of tantalum oxide ($Ta_2O_5$) on a surface of the anode body (a surface of the porous sintered body that included the inner wall surfaces of the pores) and a surface of the portion of the anode wire.

Next, 3,4-ethylenedioxythiophene serving as a raw material of a first conductive polymer, iron (III) p-toluenesulfonate, and 1-butanol were mixed, to prepare a dispersion (reaction liquid) containing a first monomer. After immersing the anode body in the dispersion, the anode body was withdrawn from the dispersion, and then heat-treated in air. In this case, iron (III) p-toluenesulfonate functions as an oxidizing agent. In this manner, the first monomer was polymerized on the dielectric layer, to form a solid electrolyte layer containing poly(3,4-ethylenedioxythiophene) (PE-DOT) as a first conductive polymer layer.

Subsequently, the anode body having the first conductive polymer layer formed thereon was washed, and thereafter poly(3,4-ethylenedioxythiophene) serving as a second conductive polymer and p-toluene sulfonate were mixed, to prepare a second dispersion. After immersing the anode body in the second dispersion, the anode body was withdrawn from the second dispersion, and the anode body was impregnated with the second dispersion. Thereafter, drying treatment was performed at 80° C. for 20 minutes under an atmospheric pressure, to form a second conductive polymer layer.

Next, under an environment at 25° C., the anode body having the first and second conductive polymer layers formed thereon was immersed in an aqueous solution containing 1-butyl-3-methylimidazolium hydrogen sulfate that was an ionic liquid. The anode body was placed in a vacuum desiccator, in which the pressure was reduced to −95 kPa with respect to the atmospheric pressure and then returned to the atmospheric pressure, and the anode body was held for 10 minutes, thus impregnating the salt compound into the solid electrolyte layer. Thereafter, drying treatment was performed at 130° C. for 10 minutes, to obtain an anode body A1.

The anode body A1 was cut along a surface that passes through the center of the anode body and that is perpendicular to a surface of 5.0 mm×4.0 mm and a surface of 4.0 mm×1.0 mm, to form a cross section. Along the cross section, the anion strength was measured by time-of-flight secondary ion mass spectrometry (TOF-SIMS). Measurement locations were scanned in the surface layer part in the cross section, and a ratio $R1=B1/A1$ of the strengths (the number counted) $B1$ of the secondary anions derived from the salt compound to a sum $A1$ of the strengths (the number counted) of all of the detected secondary anions, was determined. Similarly, the measurement locations were scanned in the central part in the cross section, and a ratio $R2=B2/A2$ of the strengths (the number counted) $B2$ of the secondary anions derived from the salt compound to a sum $A2$ of the strengths (the number counted) of all of the detected secondary anions, was determined. The ratio $R2/R1$ was 0.4.

Using the anode body A1, a carbon paste and a metal paste were sequentially applied to a predetermined region of the surface of the solid electrolyte layer, to form a cathode layer composed of a carbon layer and a silver paste layer, thus obtaining a capacitor element.

An anode lead terminal and a cathode lead terminal were further disposed on the capacitor element, and an exterior member was formed using a resin containing silica particles as a filler. Thereafter, portions of the anode lead terminal and the cathode lead terminal that protruded from the exterior member were bent along the exterior member, to produce an electrolytic capacitor C1 having the structure shown in FIG. 3.

Example 2

In Example 1, the pressure applied when immersing the anode body in the aqueous solution containing 1-butyl-3-methylimidazolium hydrogen sulfate that was an ionic liquid, and the pressure in the vacuum desiccator was set to −50 kPa with respect to the atmospheric pressure. Except for this, an anode body A2 was obtained in the same manner as in Example 1. Using the anode body A2, an electrolytic capacitor C2 was produced.

In the same manner as in Example 1, a cross section of the anode body A2 was formed, and analysis using time-of-flight secondary ion mass spectrometry (TOF-SIMS) was performed, to determine the ratio $R2/R1$. The ratio $R2/R1$ was 0.15.

Comparative Example 1

In Example 1, the pressure applied when immersing the anode body in the aqueous solution containing 1-butyl-3-methylimidazolium hydrogen sulfate that was an ionic liquid was changed. The anode body was immersed for 10 minutes under an atmospheric pressure, without reducing the pressure. Except for this, an anode body B1 was obtained in the same manner as in Example 1. Using the anode body B1, an electrolytic capacitor C3 was produced.

In the same manner as in Example 1, a cross section of the anode body B1 was formed, and analysis using time-of-flight secondary ion mass spectrometry (TOF-SIMS) was performed, to determine the ratio $R2/R1$. The ratio $R2/R1$ was 0.03.

Comparative Example 2

In Example 1, the anode body was not immersed in an ionic liquid. Except for this, an anode body B2 was obtained in the same manner as in Example 1. Using the anode body B2, an electrolytic capacitor C4 was produced.

The electrolytic capacitors C1 to C4 according to the examples and the comparative example produced as described above were evaluated as follows.
[Evaluation]

Under an environment at 20° C., a capacitance $C_0$(F) of each of the electrolytic capacitors was measured using an LCR meter for 4-terminal measurement, and evaluated as the initial capacitance.

Next, at a temperature of 105° C., a voltage of 50 V was applied to the electrolytic capacitor for 750 hours. Thereafter, the capacitance $C_1$(F) was measured in the same manner as described above. Then, $X=(C_1/C_0)×100$ was evaluated as the capacitance retention rate. The evaluation results are shown in Table 1. Table 1 also shows the values of the ratio $R2/R1$ of the anode bodies used for the evaluation.

TABLE 1

| Anode body | R2/R1 | Capacitance retention rate X (%) |
|---|---|---|
| A1 | 0.4 | 98 |
| A2 | 0.15 | 92 |
| B1 | 0.03 | 3 |
| B2 | — | 26 |

From Table 1, it can be seen that, in the case of using the anode body A1 or A2, for which the value of the ratio $R2/R1$ was 0.15 or more, a reduction in capacitance of the electrolytic capacitor was suppressed, thus making it possible to maintain the high reliability of the electrolytic capacitor even if the state in which a high voltage was applied under a high temperature was maintained for a long period of time. In the case of the anode body B1, as a result of the ionic liquid being localized in the surface layer part of the anode body, the capacitance retention rate was more significantly reduced than that of the anode body B2 that was not impregnated with the ionic liquid, so that it is considered that immersion under an atmospheric pressure is insufficient as the process of impregnating the ionic liquid.

INDUSTRIAL APPLICABILITY

The present invention is applicable to electrolytic capacitors, and can be preferably applied to an electrolytic capacitor that uses a porous body as the anode body.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

20: Electrolytic capacitor
10: Capacitor element
1: Anode body
2: Anode wire
2a: First portion
2b: Second portion
3: Dielectric layer
4: Solid electrolyte layer
5: Cathode layer
5a: Carbon layer
5b: Conductive resin layer
6: Anode part
7: Cathode part
8: Conductive adhesive material
11: Exterior member
13: Anode lead terminal
14: Cathode lead terminal
14a: Joining part

The invention claimed is:

1. An electrolytic capacitor comprising:
a porous anode body;
a dielectric layer formed on a surface of the anode body; and
a conductive polymer and a salt compound that are filled inside pores of the anode body, wherein
the salt compound is a salt of a cation and an anion,
when L is a shortest distance from a center of the anode body to a first principal surface of the anode body, the first principal surface being closest to the center,
a region in which a minimum value of respective distances to principal surfaces of the anode body is L/3 or less is defined as a surface layer part inside the anode body,
a region in which a minimum value of the respective distances to the principal surfaces of the anode body is 2L/3 or more is defined as a central part inside the anode body,
R1 (=B1/A1) is a ratio of an ion strength B1 derived from the salt compound to a sum A1 of all ion strengths measured by time-of-flight secondary ion mass spectrometry (TOF-SIMS) in a cross section of the surface layer part that passes through the center and perpendicular to the first principal surface, and
R2 (=B2/A2) is a ratio of an ion strength B2 derived from the salt compound to a sum A2 of all ion strengths measured by the time-of-flight secondary ion mass spectrometry in the cross section of the central part,
R2/R1 is 0.15 or more.

2. The electrolytic capacitor according to claim 1, wherein the R2/R1 is 0.4 or more.

3. The electrolytic capacitor according to claim 1, further comprising
an anode wire planted from the anode body, wherein
the first principal surface is a surface along a direction in which the anode wire extends inside the anode body.

4. The electrolytic capacitor according to claim 3, wherein the cross section is a surface along the direction in which the anode wire extends.

5. The electrolytic capacitor according to claim 1, wherein the salt compound is an ionic liquid.

6. The electrolytic capacitor according to claim 5, wherein the anion constituting the ionic liquid includes a hydrogen sulfate ion.

7. The electrolytic capacitor according to claim 1, wherein the salt compound is a hydrophilic ionic liquid.

8. The electrolytic capacitor according to claim 1, wherein the distance L is 0.1 mm or more.

9. The electrolytic capacitor according to claim 1, wherein the ion strength is an anion strength.

10. The electrolytic capacitor according to claim 1, wherein the ion strength is a cation strength.

* * * * *